(12) United States Patent
Chabanne et al.

(10) Patent No.: US 11,003,991 B2
(45) Date of Patent: May 11, 2021

(54) METHODS FOR SECURE LEARNING OF PARAMETERS OF A CONVOLUTION NEURAL NETWORK, AND FOR SECURE INPUT DATA CLASSIFICATION

(71) Applicant: Idemia Identity & Security France, Issy-les-Moulineaux (FR)

(72) Inventors: Herve Chabanne, Issy-les-Moulineaux (FR); Jonathan Milgram, Issy-les-Moulineaux (FR); Constance Morel, Issy-les-Moulineaux (FR); Emmanuel Prouff, Issy-les-Moulineaux (FR)

(73) Assignee: Idemia Identity & Security France, Issy-les-Moulineaux (FR)

( * ) Notice: Subject to any disclaimer, the term of this patent is extended or adjusted under 35 U.S.C. 154(b) by 892 days.

(21) Appl. No.: 15/722,490

(22) Filed: Oct. 2, 2017

(65) Prior Publication Data
US 2018/0096248 A1    Apr. 5, 2018

(30) Foreign Application Priority Data
Sep. 30, 2016    (FR) .................................. 16 59439

(51) Int. Cl.
*G06N 3/04*    (2006.01)
*G06N 3/08*    (2006.01)
(Continued)

(52) U.S. Cl.
CPC .............. *G06N 3/08* (2013.01); *G06F 17/18* (2013.01); *G06N 3/0454* (2013.01); *G06N 3/0481* (2013.01); *H04L 9/008* (2013.01)

(58) Field of Classification Search
CPC .............................. G06N 3/04; G06N 3/0454
See application file for complete search history.

(56) References Cited

U.S. PATENT DOCUMENTS

| | | | | |
|---|---|---|---|---|
| 10,311,342 B1 * | 6/2019 | Farhadi | .................... | G06K 9/52 |
| 2015/0142715 A1 * | 5/2015 | Esterline | .................. | G06N 7/00 |
| | | | | 706/23 |

(Continued)

FOREIGN PATENT DOCUMENTS

| | | |
|---|---|---|
| WO | WO 2016/118206 A2 | 7/2016 |
| WO | WO 2016/118206 A3 | 7/2016 |

OTHER PUBLICATIONS

Gilad-Bachrach, Ran, et al. "Cryptonets: Applying neural networks to encrypted data with high throughput and accuracy." International Conference on Machine Learning. 2016. (Year: 2016).*

(Continued)

*Primary Examiner* — Hal Schnee
(74) *Attorney, Agent, or Firm* — Oblon, McClelland, Maier & Neustadt, L.L.P.

(57) ABSTRACT

A method for secure learning of parameters of a convolution neural network, CNN, for data classification includes the implementation, by data processing of a first server, including receiving from a second server a base of already classified learning data, the learning data being homomorphically encrypted; learning in the encrypted domain, from the learning database, the parameters of a reference CNN including a non-linear layer (POLYNOMIAL) operating an at least two-degree polynomial function approximating an activation function; a batch normalization layer before each non-linear layer (POLYNOMIAL); and transmitting the learnt parameters to the second server, for decryption and use for classification.

17 Claims, 4 Drawing Sheets

(51) Int. Cl.
*G06F 17/18* (2006.01)
*H04L 9/00* (2006.01)

(56) References Cited

U.S. PATENT DOCUMENTS

2016/0350648 A1    12/2016  Gilad-Bachrach et al.
2017/0323196 A1*   11/2017  Gibson .................... G06N 3/04
2017/0337682 A1*   11/2017  Liao .......................... G06T 7/30

OTHER PUBLICATIONS

Orlandi, Claudio, Alessandro Piva, and Mauro Barni. "Oblivious neural network computing via homomorphic encryption." EURASIP Journal on Information Security 2007 (2007): 1-11. (Year: 2007).*
Search Report dated Jul. 17, 2017 in French Patent Application No. 1659439 (with English translation of categories of cited documents). 4 pages.
Sergey Ioffe, et al. "Batch Normalization: Accelerating Deep Network Training by Reducing Internal Covariate Shift", https://arxiv.org/pdf/1502.03167v3.pdf, XP055266268, 2015, pp. 1-11.
Nathan Dowlin, et al. "CryptoNets: Applying Neural Networks to Encrypted Data with High Throughput and Accuracy", Proceedings of the 33$^{rd}$ International Conference on Machine Learning, vol. 48, XP055390384, 2016, pp. 1-10.
M. Barni, et al. "A Privacy-Preserving Protocol for Neural-Network-Based-Computation", Proceedings of the 8$^{th}$ Workshop on Multimedia and Security, XP055296362, 2006, pp. 146-151.

* cited by examiner

METHODS FOR SECURE LEARNING OF PARAMETERS OF A CONVOLUTION NEURAL NETWORK, AND FOR SECURE INPUT DATA CLASSIFICATION

GENERAL TECHNICAL FIELD

The present invention concerns the field of supervised learning, and in particular methods for the secure learning of parameters of a convolution neural network, or for input data classification by means of a convolution neural network.

STATE OF THE ART

Neural networks are massively used to classify data.

After an automatic learning phase (generally supervised i.e. on a base of already classified reference data), a neural network "learns" and becomes capable alone of applying the same classification to unknown data.

Convolutional Neural Networks (CNN) are a type of neural network in which the connection pattern between neurons is inspired by the visual cortex of animals. They are therefore especially suited for a particular type of classification i.e. image analysis, since they allow efficient recognition of objects or persons in images or videos, in particular for security applications (automatic surveillance, threat detection, etc.).

At the current time, CNNs give full satisfaction, but insofar as they are most often used on sensitive and confidential data (either learning data or data to be classified), it would be desirable to make them secure.

More specifically, the learning phase allows configuration of the parameters of a CNN i.e. weights and biases.

If an entity A (e.g. a hospital) possesses reference data used to obtain the learning phase (data on patients at hospital A), and a unit B (e.g. another hospital) possesses data to be classified (the profile of a patient for whom B suspects a disease), then the situation arises in which:
- Either A must provide B with the weights and biases determined by learning, this being undesirable for A since it could reveal information on the learning base (its patients);
- Or B must provide A with the data to be classified, this being undesirable for B (since it would reveal information on its patient)

Similarly, if entity A does not have sufficient computing power to allow learning of weights and biases from its own data, this learning must be requested from an entity C (e.g. a service provider), but A does not wish C to have the learning basis or the determined weights and biases.

To solve this type of problem, a method known as homomorphic encryption is known.

More specifically, a homomorphic function $\varphi$ is a function such that, for a masking operation M such as multiplication by a mask component a, there exists an operation O such as exponentiation by a, such that $O(\varphi(x))=\varphi(M(x))$, i.e. $(\varphi(x))\hat{}a=\varphi(x*a)$. Said function can also be homomorphic between two operations Op1 and Op2 if the conducting of operation Op2 on $(\varphi(x),\varphi(y))$ allows the obtaining of $\varphi(x$ Op1 $y)$.

A homomorphic encryption system therefore allows the performing of some mathematical operations on previously encrypted data instead of on plaintext data.

Therefore, for a given computation, it becomes possible to encrypt the data, to perform certain computational operations associated with said given computation on the encrypted data, and to decrypt the same and thereby obtain the same result as if said given computation had been performed directly on the plaintext data. Advantageously, the associated computation in the encrypted domain is the same computation as in the plaintext domain, but for other homomorphic encryptions it is necessary for example to multiply the encrypted data for addition of plaintext data.

The term Fully Homomorphic Encryption (FHE) is used when it allows identical addition and multiplication in the encrypted domain.

With neural networks, the problem of securing classification is solved by providing that:
- B performs homomorphic encryption of the data to be classified, and transmits these encrypted data to A, A being unable to read these data;
- A carries out the classification phase on the encrypted data and obtains the encryption of the classification, which it is still unable to read, and sends it back to B;
- B decrypts the result of classification. It was never able to access the learning data of A.

And the problem of making learning secure is solved by providing that:
- A performs homomorphic encryption on the reference data of the learning base, and transmits these encrypted data to C, which C is unable to read;
- C implements the learning phase on the encrypted data and obtains the encryption of the learnt parameters, which it is still unable to read, and sends it back to A;
- A decrypts the learnt weights and biases, for the purpose of carrying out classification for itself or B.

However, a CNN generally contains four types of layers successively processing the information:
- the convolution layer which processes blocks of the image one after the other;
- the non-linear layer (also called correction layer) which allows pertinence of the result to be improved by applying an "activation function";
- the pooling layer which allows the grouping together of several neurons in one single neuron;
- the fully connected layer that connects all the neurons of a layer with all the neurons of the preceding layer.

At the present time, the activation function of the non-linear layer the most frequently used is the ReLU function (Rectified Linear Unit) which is equal to $f(x)=\max(0, x)$, and the pooling layer the most used is the MaxPool2×2 function which corresponds to a maximum between four values of a square (four values are pooled into one).

The convolution layer, denoted CONV, and the fully connected layer denoted FC, generally correspond to a scalar product between the neurons of the preceding layer and the weights of the CNN.

Typical CNN architectures stack a few pairs of layers CONV→RELU then add a layer MAXPOOL and repeat this scheme $[(CONV\rightarrow RELU)^p\rightarrow MAXPOOL]$ until a sufficiently small output vector is obtained, and terminate with two fully connected layers FC.

Figure 2A:
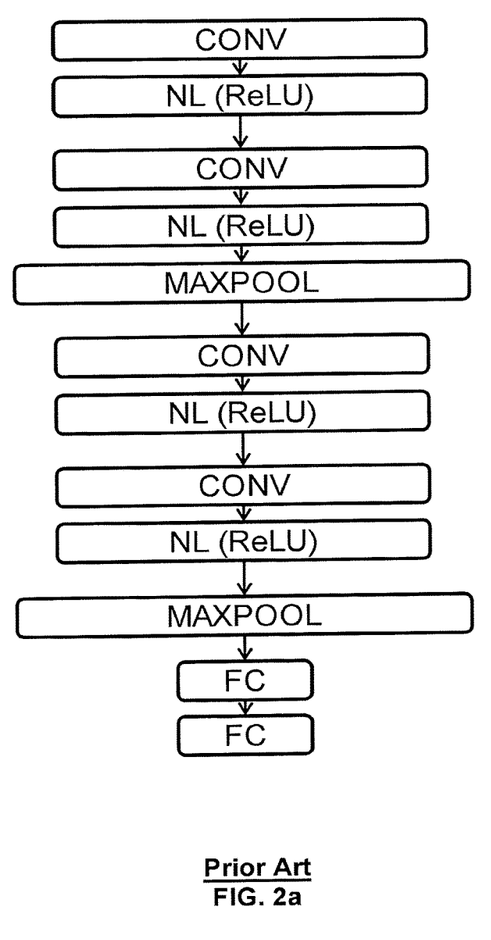
FIGS. 2a-2c illustrate three examples of convolution neural networks that are respectively: known, conform to a first embodiment of the invention and conform to a second embodiment of the invention.

Here is a typical CNN architecture (an example of which is given in FIG. 2a):

INPUT→$[[CONV\rightarrow RELU]^p\rightarrow MAXPOOL]^n\rightarrow FC\rightarrow FC$ Yet homomorphic systems generally allow operations in the encrypted domain solely for the operators + and ×, this not being the case for the functions chiefly used for the non-linear and pooling layers which precisely are not linearly dependent on input parameters (in particular ReLU and MaxPool).

Several solutions have therefore been put forward to make CNNs compatible with homomorphic systems.

In the document Ran Gilad-Bachrach, Nathan Dowlin, Kim Laine, Kristin E. Lauter, Michael Naehrig, John Wernsing. *CryptoNets: Applying Neural Networks to Encrypted Data with High Throughput and Accuracy*. ICML 2016, the MaxPool function is replaced by a SumPool function and the ReLU function is replaced by the square function ($f(x)=x^2$).

Aside from the fact that the benefit of the ReLU function is lost which is the most advanced function, the problem of training a CNN with a square function is that its derivative is not limited. This may lead to strange behaviours at the learning phase especially if the CNN is a deep network. This makes the initialisation parameters highly sensitive and hence most difficult to choose. As a result, this method is not optimal and is restricted to small, shallow CNNs.

In the document Qingchen Zhang, Laurence T. Yang, and Zhikui Chen. *Privacy preserving deep computation model on cloud for big data feature learning. IEEE Trans. Computers*, 65(5): 1351-1362, 2016, the activation function (ReLU) is replaced by a third-degree polynomial (Taylor approximation of the sigmoid function), and all the pooling layers are removed.

This method again loses the benefit of the ReLU function, but somewhat limits the divergence problem of the square function even if it is still present. On the other hand, the subsequent need to remove the pooling layers greatly lengthens processing time, making the method still further unsuitable for large CNNs.

It is therefore desirable to have available a novel solution for the learning of CNN parameters/data classification by means of a CNN that is fully compatible with homomorphic encryption, and does not limit the size of the CNN or the efficacy thereof.

SUMMARY OF THE INVENTION

In a first aspect, the present invention concerns a method for secure learning of the parameters of a convolution neural network CNN, for data classification;
  the method comprising the implementation, by data processing means of a first server, of steps of:
    (a0) Receiving from a second server a base of already classified learning data, said learning data being homomorphically encrypted;
    (a1) Learning in the encrypted domain, from said learning database, the parameters of a reference CNN comprising at least:
      a non-linear layer operating an at least two-degree polynomial function approximating an activation function;
      a batch normalization layer before each non-linear layer;
    (a2) Transmitting the learnt parameters to said second server, for decryption and use for classification.

According to a first variant of a second aspect, the present invention concerns a method for secure input data classification, characterized in that it comprises the implementation of steps of:
  (a) Learning, by data processing means of a first server from a base of already classified learning data, the parameters of a reference convolution neural network CNN comprising at least:
    a non-linear layer operating an at least two-degree polynomial function approximating an activation function;
    a batch normalization layer before each non-linear layer;
  (b) Receiving said input, homomorphically encrypted, by data processing means of a second server, from client equipment;
  (c) Classifying said encrypted input in the encrypted domain, by data processing means of the second server, by means of the reference CNN;
  (d) Transmitting the encryption of the classification obtained to said client equipment, for decryption.

According to other advantageous, non-limiting characteristics:
  step (a) is implemented in accordance with the secure learning method of the first aspect;
  said polynomial function approximating an activation function is determined before learning via polynomial regression of said activation function from points randomly selected in a given distribution;
  said polynomial function approximating an activation function is determined during learning, the coefficients of said at least two-degree polynomial function belonging to the learnt parameters.

According to a second variant of the second aspect, the present invention concerns a method for secure input data classification, characterized in that it comprises the implementation of steps of:
  (a) Learning, by data processing means of a first server from a base of already classified learning data, the parameters of a reference convolution neural network CNN comprising at least:
    a non-linear layer operating an activation function;
    a batch normalisation layer before each non-linear layer;
    the step comprising the determination of an at least two-degree polynomial function approximating said activation function;
  (b) Receiving said input, homomorphically encrypted, by data processing means of a second server, from client equipment;
  (c) Classifying said encrypted input in the encrypted domain, by the data processing means of the second server, by means of a substitution CNN using the parameters learnt for the reference CNN and comprising, instead of each non-linear layer operating the activation function, a non-linear layer operating said determined at least two-degree polynomial function;
  (d) Transmitting the encryption of the classification obtained to said client equipment, for decryption.

According to other advantageous, non-limiting characteristics:
  said polynomial function is determined at step (a) via polynomial regression of said activation function from points randomly selected in a given distribution;
  step (a), after determination of the parameters of the reference CNN, comprises the implementation of at least one additional iteration of learning on the substitution CNN to adapt the parameters to said determined polynomial function;
  said polynomial function is determined at step (a) via polynomial regression of said activation function from points recovered at the input to one or more non-linear layers of the reference CNN;
  the reference CNN comprises a convolution layer before each batch normalization layer;
  the reference CNN comprises at least one pooling layer operating a function of average pooling type, after a non-linear layer;

the reference CNN comprises at least one final, fully connected layer;

the architecture of the reference CNN is [[CONV→BN→NL]$^p$→AVERAGEPOOL]$^n$→FC→FC or [[CONV→BN→POLYNOMIAL]$^p$→AVERAGEPOOL]$^n$→FC→FC;

said activation function is of Rectified Linear Unit type, ReLU;

said polynomial function is two- or three-degree, preferably two;

said input or learning data represent images, said classification being object recognition.

In a third and fourth aspect, the invention proposes a computer programme product comprising code instructions to execute a method according to the first or second aspect for secure learning of parameters of a convolution neural network CNN, or for secure input data classification; and storage means readable by computer equipment in which a computer programme product comprises code instructions to execute a method according to the first or second aspect for secure learning of parameters of a convolution neural network CNN, or for secure input data classification.

PRESENTATION OF THE FIGURES

Other characteristics and advantages of the present invention will become apparent on reading the following description of a preferred embodiment. This description is given with reference to the appended drawings in which.

DETAILED DESCRIPTION

Architecture

According to two complementary aspects of the invention, there are proposed:
methods for secure learning of parameters of a convolution neural network (CNN) for data classification; and
methods for secure input data classification (using a CNN advantageously learnt by means of one of the first methods).

More specifically, the learning and/or use of the CNN can be made secure i.e. carried out in the encrypted domain by means of the present invention. Different embodiments of these two types of methods will be given.

Figure 1:
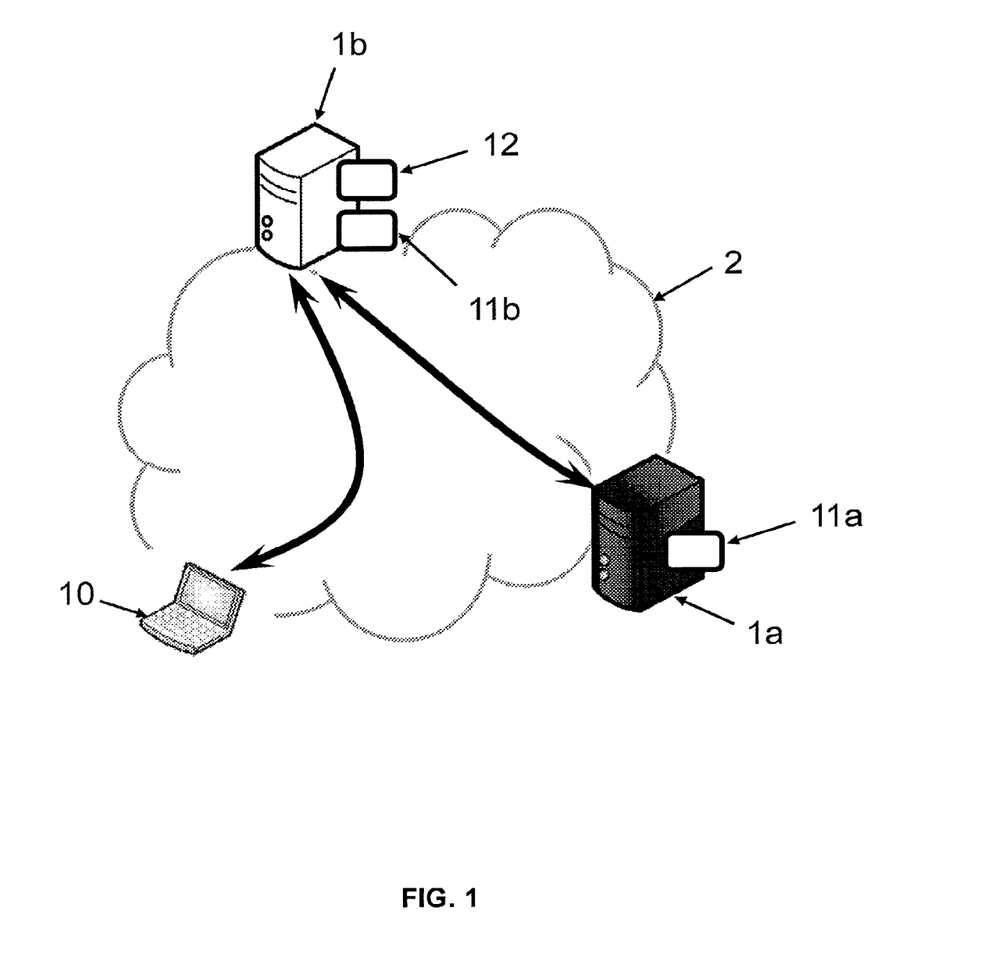
FIG. 1 is a schematic of an architecture to implement the methods of the invention.

These two types of methods are implemented within an architecture such as illustrated in FIG. 1, by means of a first and/or second server 1a, 1b. The first server 1a is the learning server (implementing the first method) and the second server 1b is a classification server implementing the second method; it possesses the learning database in plaintext). It is fully possible that these two servers may be merged, but the security offered by the present invention is used to full advantage when they are separate i.e. when it is desirable that the parameters of the CNN and/or the learning base should not be communicated in plaintext from one to the other.

Each of these servers 1a, 1b is typically remote computer equipment connected to an extended network 2 such as the Internet for data exchange. Each one comprises data processing means 11a, 11b of processor type (in particular the data processing means 11a of the first server have strong computing power, since learning is long and complex compared with ordinary use of the learnt CNN), and optionally storage means 12 such as a computer memory e.g. a hard disk.

The memory 12 of the second server 1b stores said learning database i.e. a set of already classified data (as opposed to so-called input data that precisely it is sought to classify).

The architecture advantageously comprises one or more items of client equipment 10, which may be any work station (also connected to network 2), preferably separate from the servers 1a, 1b but possibly being merged with one and/or the other thereof. The client equipment 10 has one or more data items to be classified that it does not wish to communicate in plaintext to the servers 1a, 1b. The operators of the equipment are typically "clients" in the commercial meaning of the term, of the service provider operating the second server 1b.

The input or learning data, advantageously represent images (said classification being object recognition), and an example will be cited wherein the client equipment 10 is connected to a security camera, and the client entrusts the service provider with classification of the (potentially confidential) images taken by the camera.

According to one preferred embodiment (such as illustrated FIG. 1) combining the two types of methods of the invention, the system comprises the first server 1a and the client equipment 10, each connected to the second equipment 1b via network 20, and:

the second server 1b transfers to the first server 1a the encrypted learning database;

the first server 1a uses its computing power to implement a method for secure learning of parameters of a CNN on this encrypted learning database, and it transmits to the second server 1b the learnt CNN parameters that themselves are encrypted;

the second server 1b carries out a secure classification method of the encrypted input transmitted by the client equipment 10, by means of a CNN using the parameters recovered from the first server 1a and decrypted;

the second server 1b sends back to the client equipment 10 the encrypted result of classification.

However, it will be understood that it is possible to perform secure classification from a CNN learnt in conventional manner (not secured) and conversely (conventional classification using a CNN learnt in secure manner).

Secure Learning Method

In a first aspect, there is proposed a learning method, implemented by the data processing means 11a of the first server 1a.

At a first step (a0) already mentioned, they receive the base of already classified learning data from the second server 1b, said learning data being homomorphically encrypted.

Numerous homomorphic functions are known to persons skilled in the art, and the latter can select the function of their choice, advantageously a "fully homomorphic" function e.g. the BGV function (Brakerski, Gentry and Vaikuntanathan).

At step (a1), from said learning database (encrypted), the first server in secure manner i.e. directly in the encrypted domain as explained (from learning data that are encrypted), learns the parameters of a so-called reference CNN (as opposed to a substitution CNN, see below), comprising at least:

a non-linear layer (that will be called "POLYNOMIAL layer") operating an at least two-degree polynomial function approximating an activation function;

a batch normalization layer (that will be called "BN layer") before each non-linear POLYNOMIAL layer.

The idea is to approximate the activation function (in particular a ReLU function, but it will be understood that other activation functions are possible such as the Heaviside function, even if the example of ReLU is used in the remainder of the description) via a polynomial at least of degree two, advantageously at least three, and more advantageously exactly two, to create a non-linear "substitution" POLYNOMIAL layer, whilst adding the BN layer before this POLYNOMIAL layer so as to obtain a reduced centred Gaussian distribution at the input to the POLYNOMIAL layer, thus avoiding the problem of divergence and allowing excellent local approximation of the activation function (since the approximation "domain" is reduced to this distribution and no longer to all real values), at all events much better than with a square function or sigmoid function as has been attempted, and without requiring heavy computation (in particular when remaining at degree of two).

BN layers are known in the realm of CNNs but up until now they were solely used to accelerate learning of data (and never for security purposes) and always in combination with non-linear layers with an activation function "as such" (i.e. non-approximated).

The polynomial function approximating the target activation function (advantageously ReLU) is determined:
either before learning via polynomial regression of said activation function from points randomly selected in a given distribution (e.g. a reduced centred Gaussian distribution or uniform distribution over [−4; 4]);
or during learning, the coefficients of said polynomial function at least of degree two belonging to the learnt parameters. It is to be noted that a different polynomial can be learnt per non-linear layer.

As in "non-secure" CNNs, the reference CNN obtained by means of the present method advantageously comprises a convolution layer CONV before each batch normalization layer BN, and hence a pattern [CONV→BN→POLYNOMIAL] is repeated.

Similarly, the reference CNN advantageously comprises at least one pooling layer, preferably operating a function of AveragePool type (called AVERAGEPOOL layer), after a non-linear POLYNOMIAL layer. This is an additional difference as compared with non-secure CNNs which preferred the MaxPool function after ReLU, and with prior art secure CNNs which proposed the use of SumPool. It will nevertheless be understood that it remains possible to use SumPool.

In addition, as is conventional, the reference CNN advantageously comprises at least one final fully connected layer FC, and preferably two.

Figure 2B:
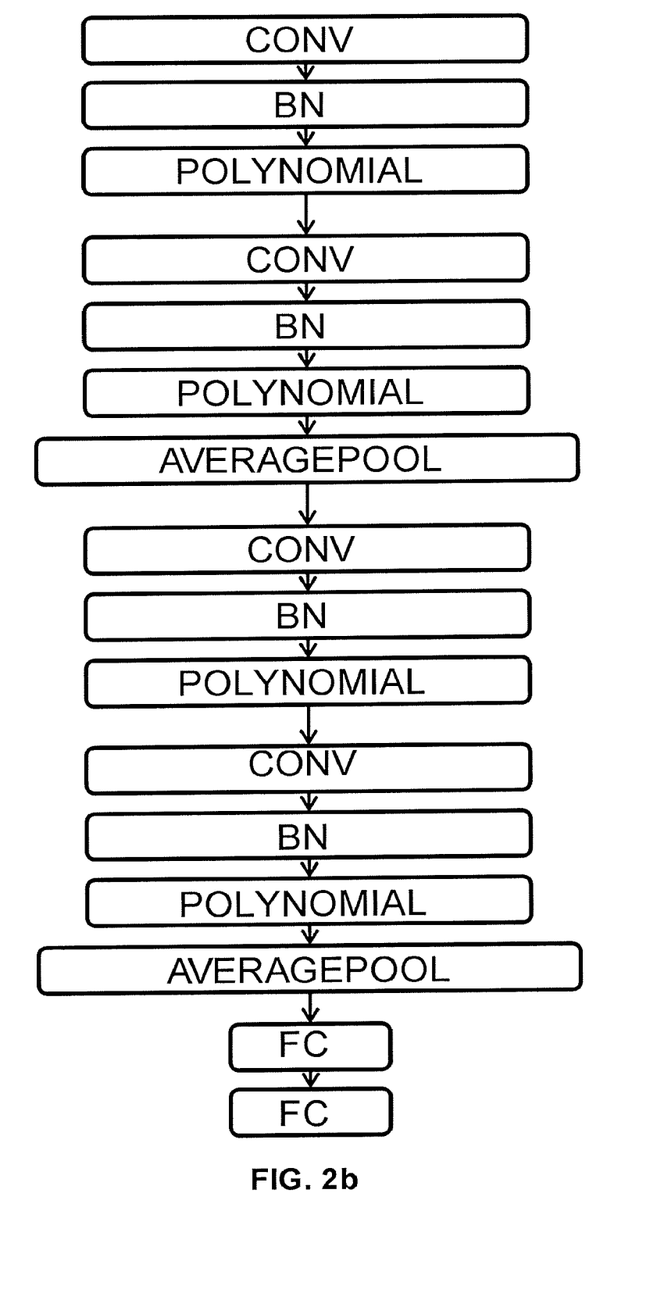

To summarize, the learnt reference CNN preferably has an architecture [[CONV→BN→POLYNOMIAL]$^p$→AVERAGEPOOL]$^n$→FC→FC such as can be seen in FIG. 2b.

Since the present reference CNN is compatible with homomorphic encryption, learning in the encrypted domain can function and allows obtaining of parameters of the CNN that themselves are encrypted. At a final step (a2) of the learning method, these learnt parameters of the CNN are transmitted to said second server 1b, for decryption and use for classification.

Secure Classification Method—First Variant

In a second aspect, there is proposed an input data classification method implemented by the data processing means 11b of the second server 1b.

Two variants of this method are possible, but in all cases the classification method comprises four major steps: at a first step (a) the learning of a reference CNN is implemented by the first server 1a; at a second step (b) said input data homomorphically encrypted is received from the client equipment 10; at a third step (c) the data processing means 11b of the second server 1b classify said encrypted input in the encrypted domain; and finally at a step (d) the encryption of the classification obtained is transmitted to said client equipment 10 for decryption.

According to the first variant of the classification method, the reference CNN learnt at step (a) at least comprises:
a non-linear POLYNOMIAL layer operating an at least two-degree polynomial function approximating an activation function (ReLU as explained);
a batch normalization layer BN before each non-linear POLYNOMIAL layer.

In other words, in this embodiment, the reference CNN conforms to a CNN obtained via the method of the invention, with the sole difference that it can optionally be obtained directly in the plaintext domain i.e. without homomorphic encryption of the learning data. However, preferably, learning is secured and conforms to the method according to the first aspect.

All the optional characteristics and advantages of the reference CNN that are described for the learning method can be transposed, in particular use is made of pooling layers of AveragePool type.

Similarly, the polynomial function approximating the target activation function is determined:
either independently of learning via polynomial regression of said activation function from points randomly selected in a given distribution (e.g. a reduced centred Gaussian distribution or uniform distribution over [−4; 4]);
or during learning, the coefficients of said polynomial function at least of degree two belonging to the learnt parameters. It is to be noted that a different polynomial can be learnt per non-linear layer.

In this variant, at step (c) said encrypted input is classified in the encrypted domain, directly by means of the reference CNN such as learnt.

Secure Classification Method—Second Variant

According to the second variant of the classification method, the reference CNN learnt at step (a) at least comprises:
a non-linear layer NL operating an activation function (as before, in particular ReLU);
a batch normalization layer BN before each non-linear layer NL.

In other words, it is a conventional CNN wherein the activation function is not approximated. It will therefore be understood that said CNN cannot be learnt using the method according to the first aspect of the invention, and cannot be used in the encrypted domain.

However, aside from this difference, all the optional and advantageous characteristics of the reference CNN described for the learning method are transposable, in particular use is made of pooling layers of AveragePool type.

Figure 2C:
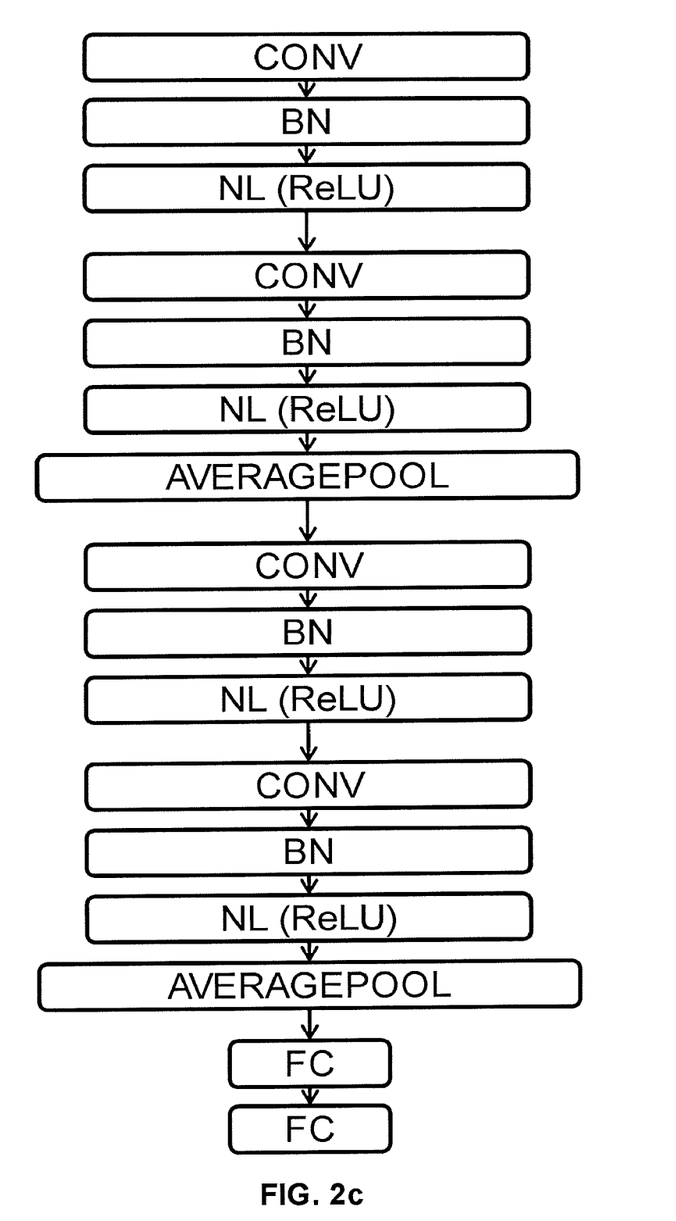

To summarise, the reference CNN learnt for this variant preferably has the architecture [[CONV→BN→NL]$^p$→AVERAGEPOOL]$^n$→FC→FC such as can be seen in FIG. 2c.

However, step (a) also comprises determination of the polynomial function of least degree two approximating said activation function since, such as it is, the reference CNN is not compatible with homomorphic encryption.

To do so:
either, as in the first variant, the polynomial function is determined at step (a) via polynomial regression of said activation function from points randomly selected in a given distribution e.g. a reduced centred Gaussian distribution or uniform distribution over [=4; 4], or said polynomial function is determined at step (a) via polynomial regression of said activation function from points recovered at the input to one or more non-linear layers NL of the reference CNN.

In the first case, the polynomial is again learnt independently of the learning base.

In the second case, the polynomial can either be global (the inputs to all the layers NL are recovered on the learning base for the reference CNN and polynomial regression is performed on this distribution), or it can be associated with a layer and in this latter case a polynomial is obtained per non-linear layer approximating the activation function of the layer (for each layer NL the inputs to this layer are recovered on the learning base for the reference CNN and polynomial regression is performed for each layer NL on the distribution of this layer).

Next, in this variant, at step (c) said encrypted input is classified in the encrypted domain by means of a so-called substitution CNN which is compatible with homomorphic encryption.

The substitution CNN uses the parameters learnt for the reference CNN and, instead of each "true" non-linear layer NL operating the activation function, it comprises a POLYNOMIAL non-linear layer operating said determined at least two-degree polynomial function (globally or determined for this layer NL).

In other words, each POLYNOMIAL layer is a substitution layer of a layer NL. For example, for a reference CNN with an architecture of type [[CONV→BN→NL]$^p$→AVERAGEPOOL]$^n$→FC→FC previously mentioned, the corresponding substitution CNN has the architecture [[CONV→BN→POLYNOMIAL]$^p$→AVERAGEPOOL]$^n$→FC→FC such as can be seen in FIG. 2b.

The substitution CNN obtained is then similar to a reference CNN such as used by the first variant of the secure classification method, and/or such as it could be obtained via the secure learning method of the first aspect.

It is to be noted that—prior to classification—step (a), after determination of the parameters of the reference CNN, may preferably comprise the implementation of at least one additional iteration of learning on the substitution CNN to adapt the parameters to said determined polynomial function.

Computer Programme Product

In a third and fourth aspect, the invention concerns a computer programme product comprising code instructions to execute a method (particularly on the data processing means 11a, 11b of the first or second server 1a, 1b) according to the first aspect of the invention for secure learning of parameters of a CNN, or a method according to the second aspect of the invention for secure input data classification, and storage means readable by computer equipment (memory of the first or second server 1a, 1b) provided with this computer programme product.

The invention claimed is:

1. A method for secure learning of parameters of a convolution neural network, CNN, for input data classification, the method comprising the implementation, by data processing means of a first server, of steps of:
  receiving from a second server a base of already classified learning data, said learning data being homomorphically encrypted;
  learning in an encrypted domain, from said base of already classified learning data, the parameters of a reference CNN comprising at least:
    a non-linear layer (POLYNOMIAL) operating an at least two-degree polynomial function approximating an activation function, and
    a non-approximated batch normalization layer before each non-linear layer (POLYNOMIAL); and
  transmitting the learnt parameters to said second server, for decryption and use for classification.

2. The method according to claim 1, wherein said polynomial function is determined before learning via polynomial regression of said activation function from points randomly selected in a given distribution.

3. The method according to claim 1, wherein said polynomial function is determined during learning, the coefficients of said at least two-degree polynomial function belonging to the learnt parameters.

4. The method according to claim 1, wherein the reference CNN comprises a convolution layer before each batch normalization layer.

5. The method according to claim 1, wherein the reference CNN comprises at least one pooling layer operating a function of (AVERAGEPOOL) type, after a non-linear layer (POLYNOMIAL).

6. The method according to claim 1, wherein the reference CNN comprises at least one final, fully connected layer.

7. The method according to claim 4, wherein the reference CNN comprises at least one pooling layer operating a function of (AVERAGEPOOL) type, after a non-linear layer (POLYNOMIAL), wherein the reference CNN comprises at least one final, fully connected layer, and wherein the architecture of the reference CNN is $^p$→AVERAGEPOOL]$^n$→FC→FC or $^p$→AVERAGEPOOL]$^n$→FC →FC.

8. The method according to claim 1, wherein said activation function is of Rectified Linear Unit type, ReLU.

9. The method according to claim 1, wherein said polynomial function is of degree two or three, preferably two.

10. The method according to claim 1, wherein said input data or learning data represent images, said classification being object recognition.

11. A non-transitory storage means readable by computer equipment on which a computer programme product is installed comprising code instructions for execution of the method according to claim 1 for the secure learning of parameters of a convolution neural network CNN.

12. A method for secure input data classification, comprising:
  learning, by data processing means of a first server from a base of already classified learning data, parameters of a reference convolution neural network CNN comprising at least:
    a non-linear layer (POLYNOMIAL) operating an at least two-degree polynomial function approximating an activation function, and
    a non-approximated batch normalization layer before each non-linear layer (POLYNOMIAL);
  receiving said input data, homomorphically encrypted, by data processing means of a second server, from client equipment;
  classifying said encrypted input data in an encrypted domain by the data processing means of the second server, with the reference CNN, so as to obtain an encrypted classification result; and
  transmitting the obtained encrypted classification result to said client equipment, for decryption.

13. The method according to claim 12, wherein said learning includes receiving from the second server the base of already classified learning data, said learning data being homomorphically encrypted, and the learning is performed in the encrypted domain.

14. A method for secure input data classification, comprising:
- learning, by data processing means of a first server from a base of already classified learning data, parameters of a reference convolution neural network, CNN, comprising at least:
  - a non-linear layer operating an activation function, and
  - a non-approximated batch normalization layer before each non-linear layer,
  the learning comprising the determination of an at least two-degree polynomial function approximating said activation function;
- receiving said input data, homomorphically encrypted, by data processing means of a second server, from client equipment;
- classifying said encrypted input data in an encrypted domain, by the data processing means of the second server, with a substitution CNN using the parameters learnt for the reference CNN and comprising, instead of each non-linear layer operating the activation function, a non-linear layer (POLYNOMIAL) operating said determined at least two-degree polynomial function, so as to obtain an encrypted classification result; and
- transmitting said obtained encrypted classification result to said client equipment, for decryption.

15. The method according to claim 14, wherein said polynomial function is determined via polynomial regression of said activation function from points randomly selected in a given distribution.

16. The method according to claim 14, wherein said polynomial function is determined via polynomial regression of said activation function from points recovered at input of one or more non-linear layers of the reference CNN.

17. The method according to claim 14, wherein the learning, after determination of the parameters of the reference CNN, comprises the implementation of at least one additional iteration of learning on the substitution CNN to adapt said parameters to said determined polynomial function.

* * * * *